United States Patent [19]

Miller

[11] 4,244,556
[45] Jan. 13, 1981

[54] VALVES OR THE LIKE

[75] Inventor: Don R. Miller, Ashland, Ohio

[73] Assignee: U-Brand Corporation, Ashland, Ohio

[21] Appl. No.: 943,004

[22] Filed: Sep. 18, 1978

[51] Int. Cl.³ .......................................... F16K 27/00
[52] U.S. Cl. ................................. 251/118; 251/154; 251/366
[58] Field of Search ............... 251/118, 124, 366, 153, 251/154, 155; 137/801; 222/575; 239/589, 590, 601

[56] References Cited

U.S. PATENT DOCUMENTS

| 803,893 | 11/1905 | Gold | 251/155 X |
|---|---|---|---|
| 885,865 | 4/1908 | Roth | 251/153 |
| 1,509,268 | 9/1924 | Spikings | 251/155 X |
| 2,090,381 | 8/1937 | Zagorski | 251/118 |
| 2,334,686 | 11/1943 | Binnall | 251/118 |
| 2,621,016 | 12/1952 | MacGregor | 251/118 X |
| 3,342,193 | 9/1967 | Deering et al. | 239/590 X |
| 4,026,328 | 5/1977 | Nelson | 137/801 |

FOREIGN PATENT DOCUMENTS

| 649387 | 8/1937 | Fed. Rep. of Germany | 251/118 |
| 139597 | 3/1953 | Sweden | 251/118 |
| 1249865 | 10/1971 | United Kingdom . | |

Primary Examiner—Arnold Rosenthal
Attorney, Agent, or Firm—Isler and Ornstein

[57] ABSTRACT

Valves, in the nature of sink faucets, sill cocks, boiler drains and the like are disclosed, which embody features such as enlarged flow chambers, dams, and outflow passageways or channels designed collectively to substantially decrease the turbulence of water flow and effect improved characteristics in the type of fluid discharge, control turbulence of flow and flow direction, produce a softer controlled flow pattern, retard or decrease the Venturi action created by the fluid velocity, and dispense with the need for aerators.

8 Claims, 19 Drawing Figures

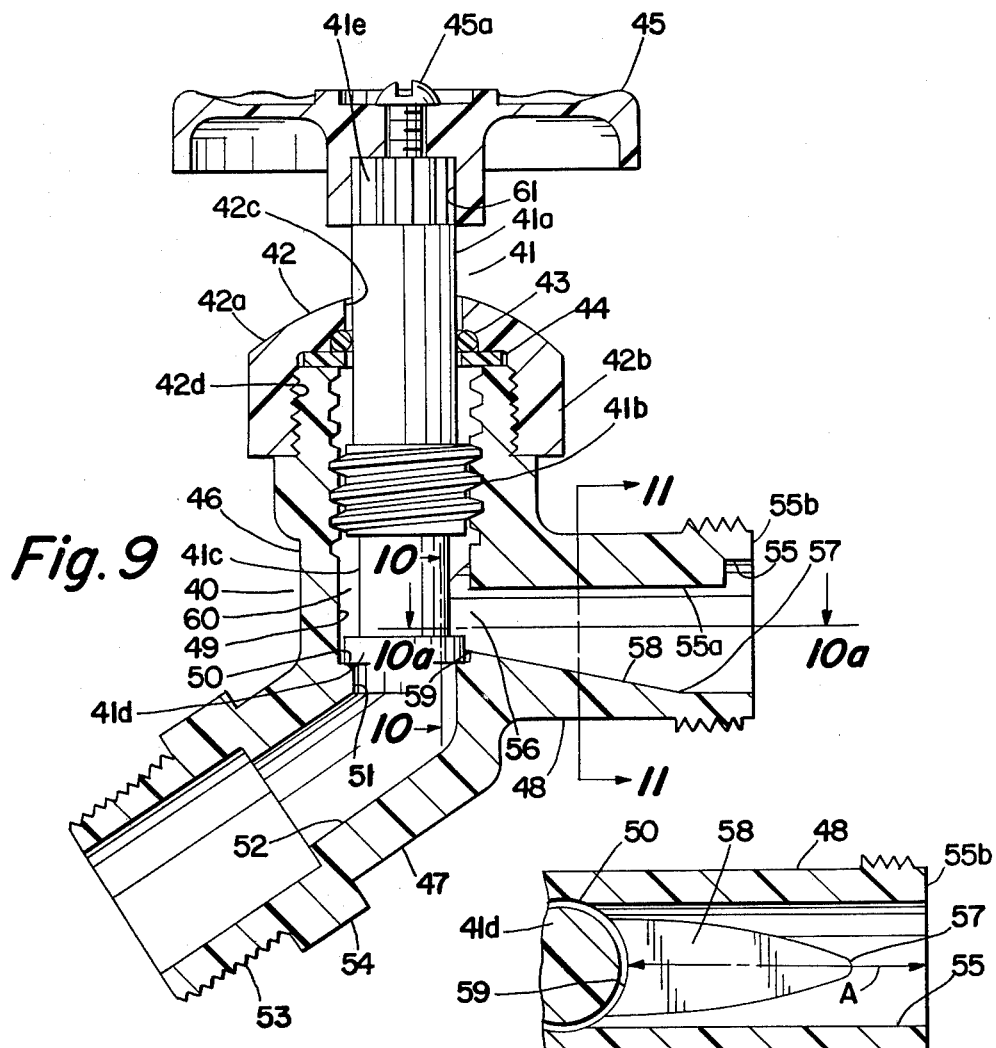
Fig. 9
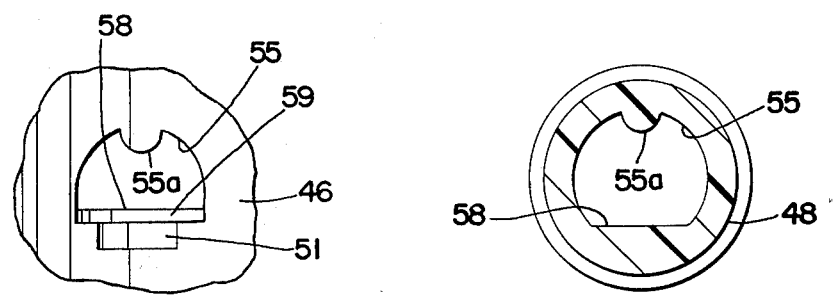
Fig. 10a
Fig. 10
Fig. 11

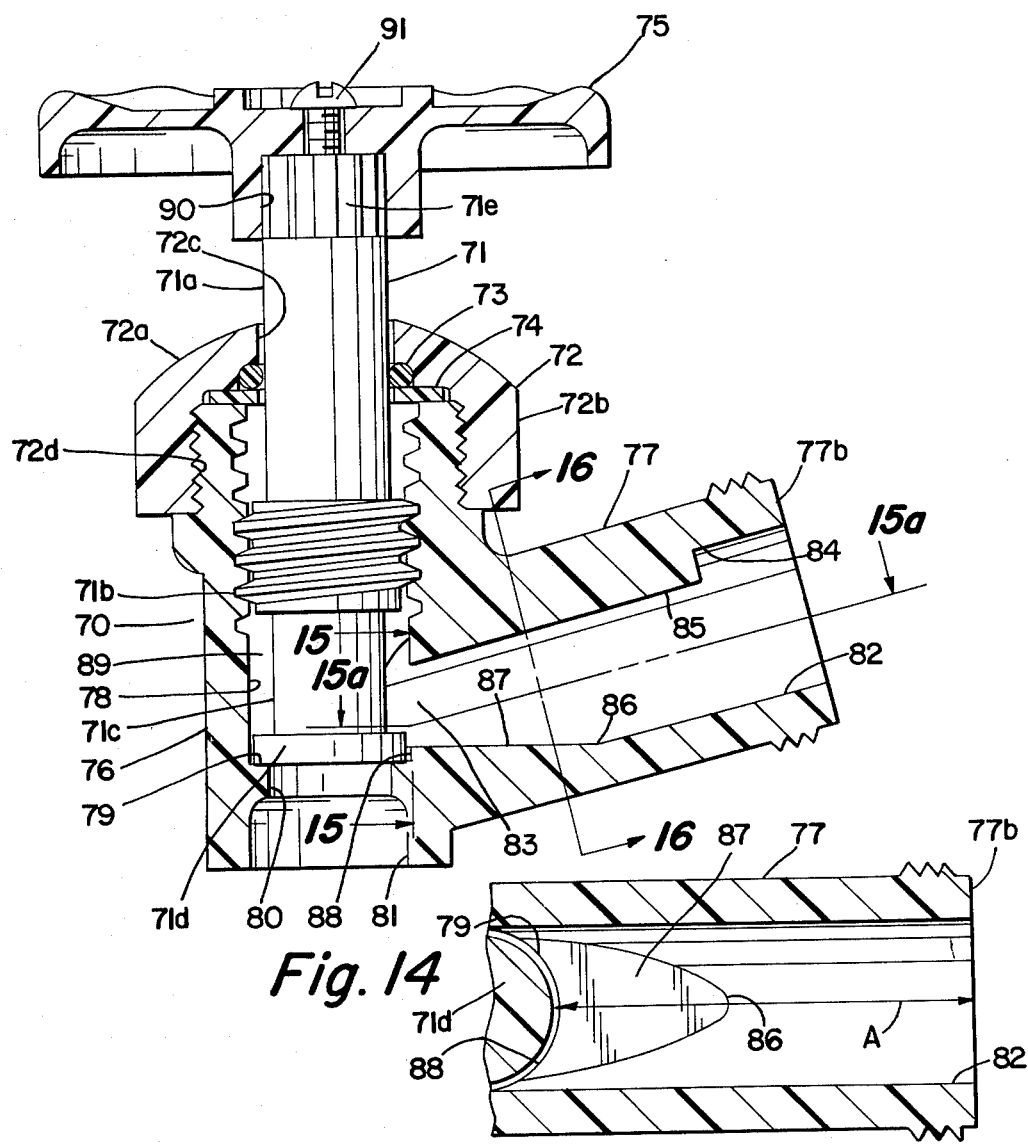
Fig. 14
Fig. 15a
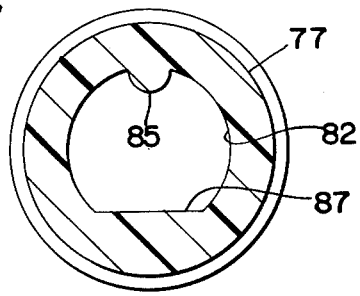
Fig. 15
Fig. 16

VALVES OR THE LIKE

This invention relates, as indicated, to valves or the like, but has reference more particularly to valves in the nature of sink faucets, sill cocks, boiler drains and the like.

A primary object of the invention is to provide valves of the character described wherein improvements of the above-described nature have been incorporated.

Other objects and advantages of the invention will become apparent in the course of the following description, taken in conjunction with the accompanying drawings wherein FIG. 1 is a top plan view of a sink faucet embodying the invention;

FIG. 9 is a cross-sectional view taken on the line 9—9 of FIG. 7;

FIG. 10 is a fragmentary cross-sectional view taken on the line 10—10 of FIG. 9, but with a portion of the stem removed to more clearly show the "dam";

FIG. 10a is a fragmentary cross-sectional view taken on the line 10a—10a of FIG. 9;

FIG. 11 is a cross-sectional view taken on line 11—11 of FIG. 9;

FIG. 14 is a cross-sectional view taken on the line 14—14 of FIG. 12;

FIG. 15 is a fragmentary cross-sectional view taken on the line 15—15 of FIG. 14, but with a portion of the stem removed to more clearly show the "dam";

FIG. 15a is a fragmentary cross-sectional view taken on the line 15a—15a of FIG. 14; and FIG. 16 is a cross-sectional view taken on the line 16—16 of FIG. 14.

Figure 1:
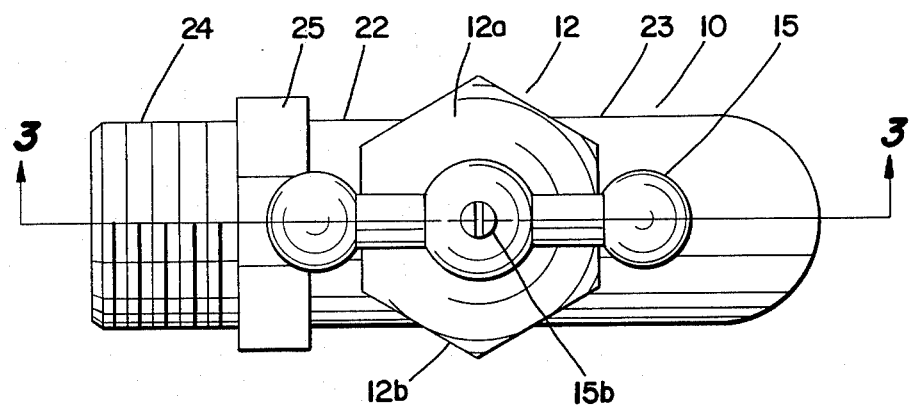
Figure 2:
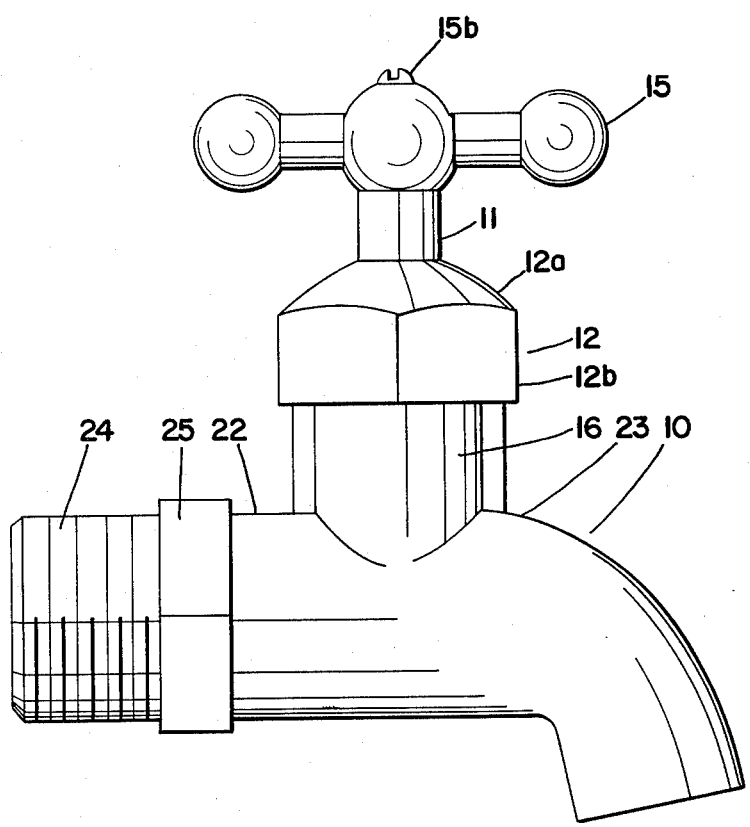
FIG. 2 is a side elevational view of the sink faucet of FIG. 1.

Referring more particularly to FIGS. 1 to 5 inclusive of the drawings, a sink faucet is shown comprising a valve body 10, a stem and valving member 11, a bonnet 12, an O-ring 13, a washer 14, and an operating handle 15.

The valve body 10 is molded in one piece, of a plastic, to provide an upstanding or vertically-disposed portion 16, having an internally-threaded stem and valving member receiving chamber 17, which terminates at its lower end, in a flat, upwardly facing annular bottom 18.

The body 10 is also provided with a cylindrical flow passage 19 of reduced diameter, which passage is concentric with and continues downwardly from the bottom 18 of the chamber 17 and communicates with a flow chamber 20 having a cylindrical wall 21. The annular bottom 18 constitutes a valve seat which interconnects the chamber 17 with the flow passage 19.

In a typical example, the stem-receiving chamber 17 has a diameter of 0.656", the valve seat 18 has an outside diameter of 0.656" and an inside diameter of 0.500", the flow passage 19 has a diameter of 0.500" and the height of the flow passage 19 is about 0.125".

The body 10 has a fluid inlet portion 22 and a fluid outlet portion 23, the inlet portion being of cylindrical cross-section and having an externally-threaded end 24 for connection to a supply pipe (not shown) or external socket for connection to a supply pipe (not shown). The portion 22 of the body 10 is further provided with a polygonal tool engaging enlargement 25 for facilitating connection with and/or removal of the body from a threaded supply pipe. The inlet portion 22 of the body 10 communicates with the flow chamber 20.

The fluid outlet portion 23 of the body 10 is of generally arcuate configuration, the construction of which is best seen in FIGS. 3, 4, 4a and 5.

This fluid outlet portion 23 is provided with a fluid outlet passageway or channel 26, which is defined in its upper portion by a wall of semi-circular transverse cross-section, and a rib 28, of semi-circular transverse cross-section, which extends radially inwardly from said wall, and longitudinally from a point spaced from the outlet end of said outlet portion to a point 27 (FIG. 3), where the channel 26 communicates with the chamber 17.

The fluid outlet passageway or channel 26 is defined, in its lower portion, by a wall 29, which is curved longitudinally and extends upwardly from the outlet end of the passageway or channel 26, to the point 27, where the passageway 26 communicates with the chamber 17.

Figure 3:
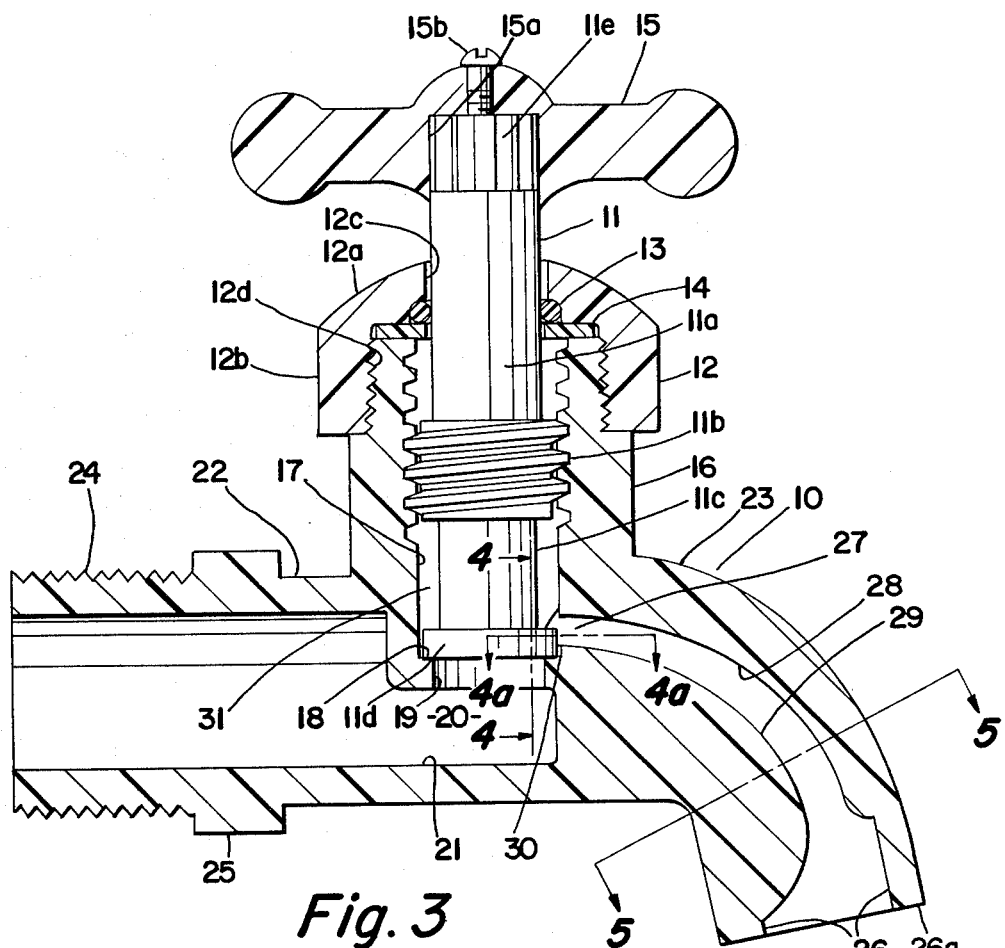
FIG. 3 is a cross-sectional view taken on the line 3—3 of FIG. 1.
Figure 5:
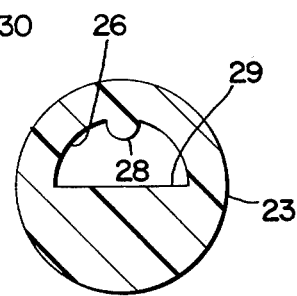
FIG. 5 is a cross-sectional view taken on the line 5—5 of FIG. 3.

As best seen in FIGS. 3 and 5, the wall 29 is flat in a transverse direction, throughout its length, and as it approaches the point 27, its distance from the rib 28 gradually decreases, so that the cross-sectional area of the passageway or channel 26 gradually decreases.

Figure 4:
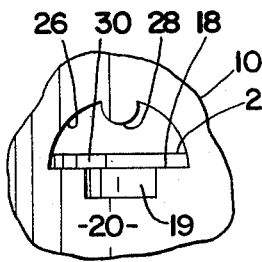
FIG. 4 is a fragmentary cross-sectional view taken on the line 4—4 of FIG. 3, but with a portion of the stem removed to more clearly show the "dam"
Figure 4A:
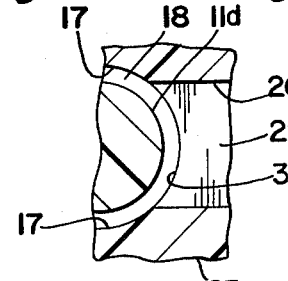
FIG. 4a is a fragmentary cross-sectional view taken on the line 4a—4a of FIG. 3.

The fluid outlet passageway or channel 26 terminates at its upper end in a "dam" 30, which as best seen in FIGS. 3, 4 and 4a, extends vertically downward from the wall 29 to the level of the valve seat 18, and is of arc-shaped configuration, as best seen in FIG. 4a. It may be noted at this point, that the "dam" 30 is disposed in its entirety, above the level of the valve seat 18 and that the depth of the "dam" may, for the purpose of this invention, be as small as 1/16".

The function of the enlarged chamber 31, the rib 28, the surface 29 and the "dam" 30 will be presently explained.

The stem and valving member 11 of the faucet is also molded in one piece, of a plastic. It has an elongated upper portion 11a of predetermined diameter, the lower part of which is provided with external threads 11b, which are in threaded engagement with the threads of the portion 16 of the body 10. It also has a somewhat shorter portion 11c, below the threads 11b, which portion is of a diameter substantially less than that of the portion 11a, whereby to provide between it and the wall of the chamber 17, an annular chamber 31, which serves a purpose to be presently described.

Below the portion 11c of the stem, the stem is provided with a portion 11d of a diameter slightly less than that of the chamber 17, and which constitutes the valve seating portion of the stem, or valve closure which is adapted to seat on the valve seat 18. Instead of the portion 11d being integral with the stem, this may be a washer, which is removably secured to the stem, as disclosed in my U.S. Pat. No. 4,167,195 issued Sept. 11, 1979.

The bonnet 12 of the faucet is also molded in one piece, of a plastic, and comprises an upper dome-like portion 12a and a lower multi-sided collar portion 12b depending from the portion 12a.

The portion 12a has a central aperture 12c through which the portion 11a of the stem 11 freely extends, while the collar portion 12b is internally threaded, as at 12d, for threaded engagement with the threads of the portion 16 of the body 10.

The handle 15 is also molded in one piece, of a plastic, and is provided with splines 15a, whereby the splines may be interfitted with splines 11e at the upper end of the stem 11, for the purpose of enabling the stem to be rotated by the handle 15 to open or close the faucet. The handle is secured to the stem by means of a screw 15b.

The function and advantages of the several features which have been described may now be explained as follows:

When the valve is partially opened, the annular chamber 31 provides an enlarged water chamber or reservoir which substantially decreases the turbulence of water flow, and effects improved characteristics in the type of fluid discharge. In the absence of such an annular chamber, when the valve is partially opened, the fluid escapement was of high uncontrolled velocity, under the valve seat and continuing to the fluid exit.

The dam 30 had a beneficial effect in controlling turbulence of flow and flow direction, when the valve is partially opened, and acts as a fluid guide to produce a softer controlled flow pattern, by reducing the velocity of flow, in a desired manner.

The surface 29 of the fluid passageway or channel 26 acts to retard or decrease the Venturi action created by the fluid velocity in the passageway 26, decreasing the velocity of the discharge, and dispensing with the need for an aerator.

The rib 28 decreases or eliminates the spiral turbulence of the fluid flow in the discharge, which again acts to decrease the Venturi action of the passageway 26, controls the spiral velocity by slowing the fluid flow and controls the pattern of the exit flow.

Figure 6:
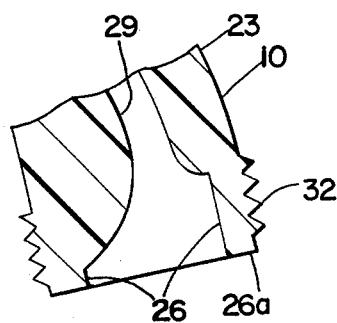
FIG. 6 is a fragmentary cross-sectional view of a modification of the faucet shown in FIG. 3, but adapted for securement of a hose to the faucet.
Figure 7:
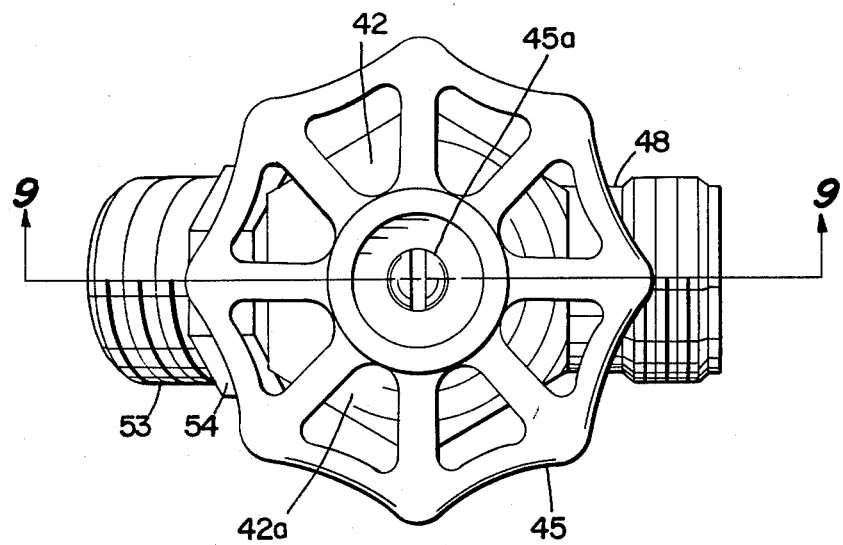
FIG. 7 is a top plan view of a sill cock embodying the invention.
Figure 8:
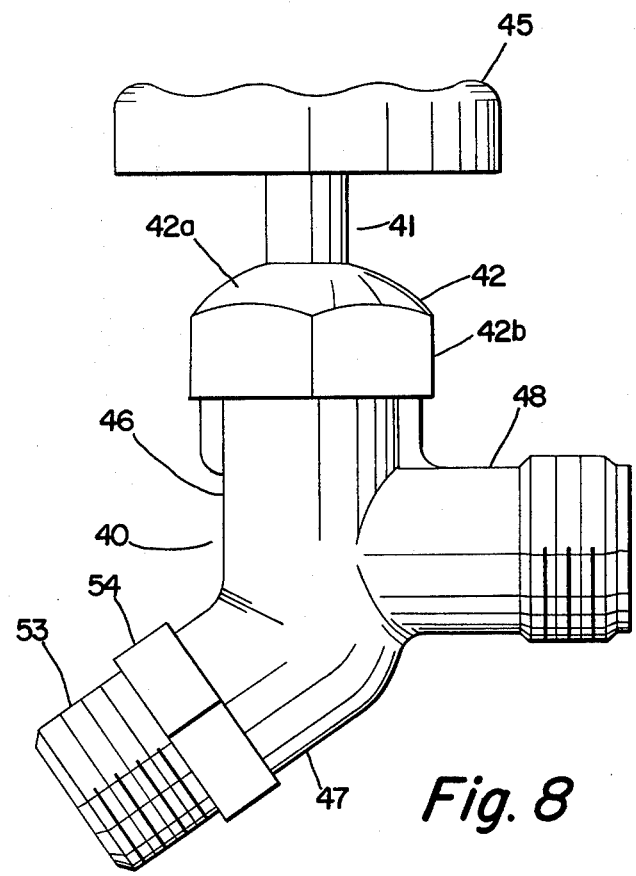
FIG. 8 is a side elevational view of the sill cock of FIG. 7.

In FIG. 6, a modification of the discharge end of the outlet or spigot 23 is shown in which the spigot is provided with external threads 32 for connection thereto of a hose (not shown). In other respects, the construction is the same as that in FIG. 3.

It may be noted in FIGS. 3 and 6, that the outlet end of the passageway 26 is at an angle of 90° to the end 26a of the faucet, in contrast to a curved corner at the intersection of the surfaces 26 and 26a. It has been found that such a sharp corner eliminates pulling the fluid from the main stream of the discharge, in contrast to a curved corner, which does pull the fluid from the main stream of the discharge.

Referring more particularly to FIGS. 7 to 11 inclusive of the drawings, a sill cock is shown comprising a valve body 40, a stem and valving member 41, a bonnet 42, an O-ring 43, a washer 44 and a wheel handle 45.

The valve body 40 is molded in one piece, of a plastic, to provide a main body portion 46, a fluid inlet branch 47 extending at an obtuse angle from the lower end of the main body portion 46 and a fluid outlet branch 48 extending at substantially right angles to the main body portion 46.

The main body portion 46 has an internally-threaded stem and valving member receiving chamber 49, which terminates at its lower end in a flat, upwardly facing annular bottom 50.

The main body portion 46 is also provided with a cylindrical flow passage 51 of reduced diameter, which passage is concentric with and continues downwardly from the bottom 50 of the chamber 49, and communicates with the fluid inlet passageway 52 in fluid inlet branch 47 of the valve body 40. The annular bottom 50 of the chamber 49 constitutes a valve seat which interconnects the chamber 49 with the flow passage 51.

The fluid inlet branch 47 has an externally-threaded end 53 for connection to a fluid supply pipe (not shown), or external socket for connection to a supply pipe (not shown), and a polygonal tool engaging enlargement 54 for facilitating connection with and/or removal of the body from a supply pipe.

The outlet branch 48 of the body 40 is generally cylindrical in shape, the construction of which is best seen in FIGS. 9, 10, 10a and 11.

This fluid outlet branch is provided with a fluid outlet passageway or channel 55, which is defined in its upper portion by a wall of substantially semi-circular transverse cross-section, and a rib 55a of semi-circular transverse cross-section, which extends radially inwardly from said wall and longitudinally from a point spaced from the outlet end of said outlet branch to a point 56 (FIG. 9), where the channel 55 communicates with the chamber 60.

This fluid outlet passageway 55 is defined, in its lower portion by a wall 58 which is straight longitudinally, and extends upwardly from a point 57, spaced inwardly from the end of the branch 48 to the point 56, where the passageway 55 communicates with the chamber 60.

As best seen in FIGS. 9 and 11, the wall 58 is flat, in a transverse direction throughout its length, and as it approaches the point 56, its distance from the rib 55a gradually decreases, so that the cross-sectional area of the passageway or channel 55 gradually decreases.

The fluid outlet passageway or channel 55 terminates at its rear end in a "dam" 59, which as best seen in FIGS. 9, 10 and 10a, extends downwardly to the level of the valve seat 50, and is of arc-shaped configuration, as seen in FIG. 10a. It may be noted at this point, that the "dam" 59 is disposed in its entirety, above the level of the valve seat 50 and that the depth of the "dam" may for the purpose of this invention, be as small as 1/16".

The stem and valving member 41 of the sill cock is also molded in one piece, from a plastic. It has an elongated upper portion 41a of predetermined diameter, the lower part of which is provided with external threads 41b, which are in threaded engagement with the threads of the main body portion 46 of the body 40. It also has a somewhat shorter portion 41c below the threaded 41b, which portion is of a diameter substantially smaller than that of the portion 41a, whereby to provide an annular chamber 60.

Below the portion 41c of the stem, the stem is provided with a portion 41d of slightly less diameter than that of the chamber 49, and which constitutes the valve seating portion of the stem, or valve closure, which is adapted to seat on the seat 50.

The bonnet 42 of the sill cock is also molded in one piece of a plastic, and comprises an upper dome-like portion 42a, and a lower multi-sided collar portion 42b depending from the portion 42a.

The portion 42a has a central aperture 42c through which the portion 41a of the stem 41 extends, while the collar portion 42b is internally threaded as at 42d, for threaded engagement with the threads of the portion 46 of the body 40.

The handle 45 is also molded in one piece, of a plastic, and is provided with splines 61, whereby the splines may be interfitted with splines 41e at the upper end of the stem 41, for the purpose of enabling the stem to be rotated by the wheel handle 45 to open or close the sill cock. The handle 45 is secured to the stem 41 by means of a screw 45a.

The functions of the enlarged annular chamber 60, the ribs 55a, the surfaces 58, and the "dam" 59, are substantially the same as those of the chamber 31, rib 28, surfaces 29 and "dam" 30 which have been explained above.

Referring to FIGS. 7, 8, 9 and 10a, it will be noted that the length of the passageway 55, which is designated by reference character A in FIG. 10a and extends from the "dam" 59 to the end of the outlet branch 48, is determined from the following formula or equation:

$$A = (C \times D \times E \times F \times G/B)$$

in which B is the volume, in cubic inches, of the passageway 55, C is the area in square inches of the flow passage 51, D is the fluid pressure in pounds per square inch, in the passageway 55, F is the height in inches of the "dam" 59, G is the area in square inches of the annular chamber 60 and A is the length in inches of the passageway 55.

The length A is a definite factor, affecting the flow discharge characteristics. It has been proven that the shorter the length of the fluid outlet, the greater the turbulence and velocity of flow, whereas, the greater the length of the fluid outlet, to a point agreeing with the result of the above formula, the lesser the turbulence and velocity of flow. A greater length beyond this point increases the turbulence.

The comments hereinabove made with reference to the angle of 90° between the end of the passageway 26 and end 26a of the faucet, are applicable also to FIGS. 9 and 10a, wherein the outlet end of the passageway 55 is at an angle of 90° to the end 55b of the sill cock.

Figure 12:
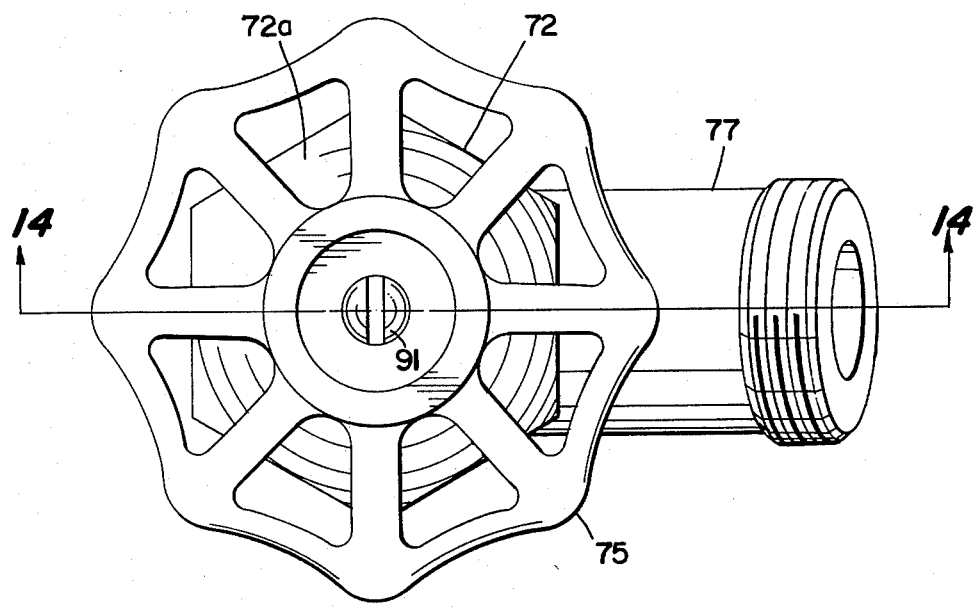
FIG. 12 is a top plan view of a boiler drain embodying the invention.
Figure 13:
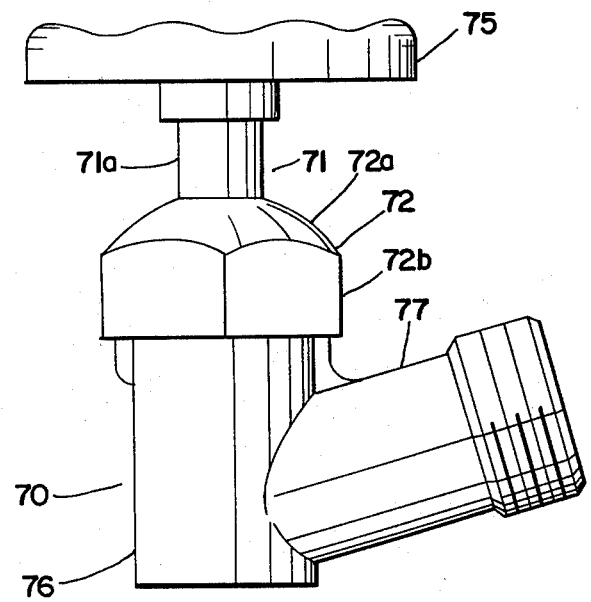
FIG. 13 is a side elevational view of the boiler drain of FIG. 12.

Referring more particularly to FIGS. 12 and 16 inclusive of the drawings, a boiler drain is shown comprising a valve body 70, a stem and valving member 71, a bonnet 72, an O-ring 73, a washer 74 and a wheel handle 75.

The valve body 70 is molded in one piece of a plastic, to provide a main body portion 76, the lower portion of which constitutes a fluid inlet and a fluid outlet branch 77 extending at an acute angle from the main body portion 76.

The main body portion 76 has an internally threaded stem and valving member receiving chamber 78, which terminates at its lower end, in a flat, upwardly facing annular bottom 79.

The main body portion 76 is also provided with a cylindrical flow passage 80 of reduced diameter, which passage is concentric with and continues downwardly from the bottom 79 of the chamber 78, and communicates with the fluid inlet passageway 81. The annular bottom 79 of the chamber 78 constitutes a valve seat which interconnects the chamber 78 with the flow passage 80.

The fluid outlet branch 77 of the body 70 is generally cylindrical in shape, the construction of which is best seen in FIGS. 14, 15, 15a and 16.

This fluid outlet branch 77 is provided with a fluid outlet passageway or channel 82, which is defined in its upper portion by a wall of substantially semi-circular transverse cross-section and a rib 85 of semi-circular transverse cross-section, which extends radially-inwardly from said wall, and longitudinally from a point 84, spaced inwardly from the outlet end of the branch 77, to a point 83 (FIG. 14), where the channel 82 communicates with the chamber 89.

This fluid outlet passageway 82 is defined in its lower portion, by a wall 87, which is straight longitudinally and extends upwardly from a point 86, spaced inwardly from the outlet end of the branch 77, to the point 83 where the channel 82 communicates with the chamber 89.

As best seen in FIGS. 14 and 16, the wall 87 is flat, in a transverse direction throughout its length and, as it approaches the point 83, its distance from the rib 85 gradually decreases, so that the cross-sectional area of the passageway or channel 82 gradually decreases.

The fluid outlet passageway or channel 82 terminates at its rear end in a "dam" 88, which as best seen in FIGS. 14, 15 and 15a, extends downwardly to the level of the valve seat 79, and is of arc-shaped configuration, as seen in FIG. 15a. It may be noted, at this point, that the depth of the "dam" may, for the purpose of this invention, be as small as 1/16".

The stem and valving member 71 of the boiler drain is also molded in one piece, from a plastic. It has an elongated upper portion 71a of predetermined diameter, the lower part of which is provided with external threads 71b, which are in threaded engagement with the threads of the main body portion 76. It also has a somewhat shorter portion 71c below the threaded portion 71b, which portion is of a diameter, substantially less than that of the portion 71a, whereby to provide an annular chamber 89 which serves a purpose to be presently explained.

Below the portion 71c of the stem, the stem is provided with a portion 71d of slightly less diameter than that of the chamber 78, and which constitutes the valve seating portion, or valve closure, which is adapted to seat on the seat 79.

The bonnet 72 of the boiler drain is also molded in one piece of a plastic, and comprises an upper dome-like portion 72a and a lower multi-sided collar portion 72b depending from the portion 72a.

The portion 72a has a central aperture 72c through which the portion 71a of the stem 71 extends, while the collar portion 72b is internally threaded, as at 72d, for threaded engagement with the threads of the portion 76 of the body 70.

The handle 75 is also molded in one piece, of a plastic, and is provided with splines 90, whereby the splines may be interfitted with splines 71e at the upper end of the stem 71, for the purpose of enabling the stem to be rotated by the handle wheel 75 to open or close the boiler drain. The wheel handle 75 is secured to the stem 71 by means of a screw 91.

The functions of the enlarged annular chamber 89, the rib 85, the surface 87, and the "dam" 88, are substantially the same as those of the chamber 31, rib 28, surface 29 and "dam" 30 which have been explained above.

Referring to FIGS. 12, 13, 14 and 15a, the passageway 82 which is designated by reference character A in FIG. 15a and extends from the "dam" 88 to the end of the outlet branch 77, is determined from the following formula or equation:

$$A = (C \times D \times E \times F \times G/B)$$

in which B is the volume in cubic inches of the passageway 82, C is the area in square inches of the flow passage 80, D is the fluid pressure in pounds per square inch in the passageway 82, F is the height in inches of the "dam" 88, G is the area in square inches of the annular chamber 89, and A is the length in inches of the passageway 82.

The length A is a definite factor, affecting the flow discharge characteristics. It has been proven that the shorter the length of the fluid outlet, the greater the turbulence and velocity of flow, whereas the greater the length of the fluid outlet, to a point agreeing with the result of the above formula, the lesser the turbulence and velocity of flow. A greater length beyond this point increases the turbulence.

The comments hereinabove made with reference to the angle of 90° between the end of the passageway 26 and end 26a of the faucet and between the outlet end of the passageway 55 and the end 55b of the sill cock, are applicable also to FIGS. 14 and 15a of the boiler drain, wherein the outlet end of the passageway 82 is at an angle of 90° to the end 77b of the boiler drain.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In a valve having a valve seat and an outlet portion having a fluid outlet passageway therein, said fluid outlet passageway comprising a wall having a transverse cross-section in the form of a downwardly facing arc of a circle, and a wall having a transverse cross-section in the form of a chord of that circle interconnecting the ends of said arc, said last-named wall terminating at one end in a dam extending from said last-named wall to said valve seat.

2. The valve defined in claim 1 said valve having a body, a flow inlet passage, a valve seat above said flow inlet passage, a dam disposed above said valve seat, a valve stem, an annular chamber between said valve stem and said body, and a fluid outlet having a flow passageway therethrough extending from said dam to the end of said fluid circuit outlet, the length of said flow passageway being determined from the equation $$A = C \times D \times E \times F \times G/B$$

wherein B is the volume in cubic inches of the flow passageway, C is the area in square inches of said flow inlet passage, D is the fluid pressure in pounds per square inch in the fluid passageway, F is the height in inches of the dam, G is the area in square inches of said annular chamber and A is the length in inches of the fluid passageway.

3. In a valve having a valve seat and an outlet portion having a fluid outlet passageway comprising a wall having a transverse cross-section in the form of a downwardly facing arc of a circle and a wall having a transverse cross-section in the form of a chord of that circle interconnecting the ends of said arc, wherein said first-named wall has a rib which extends from said wall into said passageway and extends longitudinally of said passageway.

4. A valve as defined in claim 3, wherein said rib is of semi-circular transverse cross-section.

5. A valve as defined in claim 3, wherein said first-named wall has a transverse cross-section of substantially semi-circular form.

6. A valve as defined in claim 5, wherein said second-named wall is curved longitudinally through said passageway.

7. A valve as defined in claim 3, wherein said second-named wall is inclined to the axis of said circle.

8. A valve as defined in claim 7, wherein said second-named wall is flat.

* * * * *